United States Patent
Petrovic et al.

(10) Patent No.: US 10,791,747 B2
(45) Date of Patent: *Oct. 6, 2020

(54) FOOD PROCESSING MACHINE

(71) Applicant: FORMER ASSOCIATES, LLC, Kenosha, WI (US)

(72) Inventors: James Petrovic, Kenosha, WI (US); William Bodmer, Kenosha, WI (US)

(73) Assignee: FORMER ASSOCIATES, LLC, Kenosha, WI (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/007,870

(22) Filed: Jan. 27, 2016

(65) Prior Publication Data

US 2016/0213010 A1    Jul. 28, 2016

Related U.S. Application Data

(60) Provisional application No. 62/107,793, filed on Jan. 26, 2015.

(51) Int. Cl.
*A22C 7/00* (2006.01)
*A23P 30/10* (2016.01)

(52) U.S. Cl.
CPC ............ *A22C 7/0076* (2013.01); *A23P 30/10* (2016.08); *A22C 7/0023* (2013.01); *A22C 7/0038* (2013.01); *A22C 7/0084* (2013.01)

(58) Field of Classification Search
CPC ... A22C 7/0038; A22C 7/0084; A22C 7/0023; A22C 7/0076; A23P 30/10
USPC ................. 425/139, 236, 556, 574
See application file for complete search history.

(56) References Cited

U.S. PATENT DOCUMENTS

| | | | | |
|---|---|---|---|---|
| 2,932,246 | A * | 4/1960 | Galas | A22C 7/0023 100/218 |
| 3,266,442 | A * | 8/1966 | Udall | A22C 7/00 414/789.6 |
| 3,417,425 | A * | 12/1968 | Holly | A22C 7/00 425/562 |
| 3,452,389 | A * | 7/1969 | Felstehausen | A22C 7/0076 425/441 |
| 3,474,491 | A * | 10/1969 | Holly | A22C 7/00 425/436 R |
| 3,526,924 | A * | 9/1970 | Holly | A22C 7/00 425/562 |
| 6,238,196 | B1 * | 5/2001 | Hyllstam | A21C 11/00 425/139 |
| 7,335,013 | B2 * | 2/2008 | Hansen | A22C 7/0023 425/556 |
| 7,422,425 | B2 * | 9/2008 | Hansen | A22C 7/0023 425/556 |
| 2002/0115402 | A1 * | 8/2002 | Sandberg | A22C 7/0084 452/174 |
| 2008/0179793 | A1 * | 7/2008 | Schad | B29C 45/4005 264/334 |
| 2010/0209575 | A1 * | 8/2010 | Moore | A22C 7/0038 426/389 |

(Continued)

*Primary Examiner* — Seyed Masoud Malekzadeh
(74) *Attorney, Agent, or Firm* — Sughrue Mion, PLLC

(57) ABSTRACT

One or more embodiments of the disclosure relates a food processing machine utilizing components using a variety of servo motors. The combination of the servo motors provides for a food processing machine without the need for complex hydraulics or gearboxes such that durability and compactness can be realized.

19 Claims, 12 Drawing Sheets

(56) References Cited

U.S. PATENT DOCUMENTS

2012/0045534 A1* 2/2012 Lindee ................ A22C 7/0084
　　　　　　　　　　　　　　　　　　　　　425/256

* cited by examiner

FOOD PROCESSING MACHINE

FIELD OF THE INVENTION

The invention is related to the field of machinery for food processing.

BACKGROUND

In the related art of preparing processed foods, there are a variety of machines that can be used to turn raw ingredients into processed food products. These processed foods can be of any variety of foods, including meats, vegetables, grains, or combinations thereof.

In particular, food forming machinery can create processed foods by forming the shape of the processed food. In this way, foods such as hamburger patties and chicken patties can be formed from meat. One example of this kind of food forming machinery is the Provisur Formax F-26.

Traditionally, food forming machinery of this type uses hydraulic systems or complex gear drives to control and operate the various components inside the complex machinery. These hydraulic systems or complex gear drives were necessary in order to provide sufficient force to accomplish the various steps that are needed in forming processed foods. In the case of gear drives in the related art, the complex gear drives utilize 90 degree gearboxes to change horizontal rotation of a shaft to vertical movement by ways of cams.

SUMMARY

Exemplary embodiments of the present application provide for a food processing machine utilizing components using a variety of servo motors. The use of servo motors may allow for discrete components that are controlled by means of programming. By using servo motor driven components, the food processing machine may operate quietly and be simple to service.

The use of servo motors allows for adjustment of operating rates of the individual processes. Also, the adjustment allows for changes in timing between the various components to be done by means of programming logic rather than require physical changes to a food processing machine in order to change operating rates.

Embodiments provide for a food processing machine including a knock out assembly. The knock out assembly includes a first linear motor, a return spring, and a knock out shaft that is configured to be moved in a linear motion by the first linear motor to knock out shaped food and configured to be moved in a direction of the linear motion by the return spring.

One or more embodiments further include a conveyer belt drive having a first servo motor, a conveyer belt to move food from an initial feeding area towards the knock out assembly, and a sensor configured to detect a characteristic of the food, wherein the conveyer belt is controlled by the first servo motor at variable rates based on a characteristic of the food.

Embodiments further include a feed screw drive having a second servo motor and a feedscrew configured to move the food from the conveyer belt toward a loading area, wherein the feedscrew rate of rotation can be adjusted by the second servo motor to a constant rate.

One or more embodiments further include a tube valve control for food processing. The tube valve control includes a tube valve, a second linear motor; and a linkage, wherein the second linear motor causes the tube valve to rotate from a first position to a second position to control a flow of food from the loading area to a mold plate.

In some embodiments, the food processing machine includes a stripper device for food processing. The stripper device includes a third servo motor, a cam, and a stripper plate, wherein the third cam moves the stripper plate to texturize the food positioned with a mold plate.

In some embodiments, the food processing machine includes a paper feed vacuum having vacuum suction hoses configured to move paper to receive the knocked out food and a venturi vacuum pump.

Embodiments provide for a food processing machine including a mold plate drive and a knock out assembly. The mold plate drive includes a first linear motor, a mold plate to position food, and a mold plate drive bracket, wherein the mold plate is connected to the mold plate drive bracket and the first linear motor operates in a linear motion to move the mold plate in a parallel linear motion. The knock out assembly includes a second linear motor, a return spring, and a knock out shaft that is configured to be moved in a linear motion by the second linear motor to knock out shaped food from the mold plate and configured to be moved in a direction of the linear motion by the return spring.

One or more embodiments further include a conveyer belt drive having a first servo motor, a conveyer belt to move food from an initial feeding area towards the knock out assembly, and a sensor configured to detect a characteristic of the food, wherein the conveyer belt is controlled by the first servo motor at variable rates based on a characteristic of the food.

Embodiments further include a feed screw drive having a second servo motor and a feedscrew configured to move the food from the conveyer belt toward a loading area, wherein the feedscrew rate of rotation can be adjusted by the second servo motor to a constant rate.

One or more embodiments further include a tube valve control for food processing. The tube valve control includes a tube valve, a third linear motor; and a linkage, wherein the third linear motor causes the tube valve to rotate from a first position to a second position to control a flow of food from the loading area to a mold plate.

In some embodiments, the food processing machine includes a stripper device for food processing. The stripper device includes a third servo motor, a cam, and a stripper plate, wherein the third cam moves the stripper plate to texturize the food positioned with a mold plate.

Embodiments provide for a food processing machine including a linear feed system and a knock out assembly. The linear feed system includes a first servo motor, a ball screw, and a plunger to move food towards a mold plate, wherein the first servo motor rotates such that the ball screw has a linear motion to act on the plunger. The knock out assembly includes a first linear motor, a return spring, and a knock out shaft that is configured to be moved in a linear motion by the first linear motor to knock out shaped food from the mold plate and configured to be moved in a direction of the linear motion by the return spring.

One or more embodiments further include a mold plate drive. The mold plate drive includes a second linear motor, the mold plate to position food, and a mold plate drive bracket, wherein the mold plate is connected to the mold plate drive bracket and the second linear motor operates in a linear motion to move the mold plate in a parallel linear motion.

Embodiments of the present application provide for a servo motor controlled conveyer belt drive system for an initial feeding of the ingredients for processing. The use of a servo motor may allow for adjustable rate of feed of the ingredients. The conveyer belt drive system may also incorporate sensors, such as an ingredient temperature sensor or an ingredient quantity sensor, to provide feedback for monitoring and controlling the rate of feed.

In some embodiments, the ingredients may be fed by the conveyer belt to a feed screw system. The feed screw system may comprise of a servo motor driving a feed screw. This feed screw may then move the ingredients to a loading area. By using a servo motor to drive the feed screw, it is possible to adjust the feed rate of ingredients to a consistent rate.

According to some embodiments, the ingredients may be moved by a linear feed system for loading of mold plates. One or more embodiments may use a ball screw to move a plunger to force the ingredients towards a mold plate. The ball screw may be powered by a servo motor through a gearbox and/or belt drive. In some embodiments with a plurality of ball screws and plungers, the ingredients may be moved through a tube valve which can alternate feeding of ingredients between the plurality of plungers.

In some embodiments, a linear servo motor may be used to control the tube valve. The tube valve may be configured to operate in at least two positions in order to alternate feeding of ingredients from the plurality of plungers.

According to some embodiments, a mold plate may be loaded with ingredients when in a first position. The mold plate may then be moved in a linear direction by means of a linear servo motor to a second position for interaction with a knock out assembly. The linear servo motor provides a linear driving force for movement of the mold plate. In addition to the linear servo motor, the mold plate may also be coupled to slide along at least one guide rod attached to the frame of the food processing machine.

Some embodiments may also include a stripper or shearing device for interacting with the ingredients upon loading into the mold plate. The stripper device may comprise a stripper plate, a cam, and a servo motor. The stripper device may be actuated by driving of the cam by the servo motor. In some embodiments, there may be two servo motor driven cams on opposed sides of the stripper plate. The opposed cams each push the stripper plate in opposed directions, respectively, such that the stripper plate can reciprocate.

Exemplary embodiments of the present application provide for an electrical servo knock out assembly for driving knock out cups in a food forming machine by using an electrical linear servo motor.

In embodiments of a food forming machine, ingredients are positioned under the knock out assembly with a mold plate. Upon being positioned under the knock out assembly, the knock out assembly can then knock out the desired shape of the processed food by means of driving knock out cups towards the mold plate. The knock out cups are attached to the knock out assembly, and the knock out assembly can operate to them to drive into the positioned mixture in order to knock product out of the mold plate.

By using a vertical linear servo motor, the knock out assembly of the present disclosure significantly reduces the number of components as compared to the knock out assemblies using hydraulic systems or complex gear drives. By eliminating wear components such as shafts and cams of complex gear drives, the use of the electrical linear servo motor can reduce cost by lessening the number of replacement components and increasing the length of time between scheduled maintenance.

Additionally, the use of a vertical linear servo motor may provide for a more easily accessible design for replacement of components without the need for removal of overhead cams or hydraulics.

Separately, the use of an electrical linear servo motor eliminates the potential need for a hydraulic system or oiling system for the knock out operation. This may also allow for easier packaging of the food forming machine as this eliminates the need for the complex components necessary for the operation of the hydraulic system. Additionally, the elimination of the hydraulic system removes the chance of a mess being created by a leaking of the hydraulic fluid or oil and any subsequent contamination of food due to the hydraulic fluid or oil.

One or more embodiments of the disclosure relates to an electrical servo knock out assembly for use with knock out cups in a food forming machine using an electrical linear servo motor and including the use of at least one return spring. The return spring may be a conventional spring, a magnetic spring, or other type of spring. The return spring provides for the ability to return the knock out cups away from the mold plate in the event of a power loss. This prevents crashing into the mold plate and damaging both the knock out cups and the mold plates if power is lost or there is a failure of the electrical linear servo motor when the mold plate is being positioned.

According to one or more embodiments, the knock out assembly may include a linear motor, at least one return spring, and a knock out shaft. The knock out shaft may be configured to be moved in a linear motion by the linear motor and configured to be moved in a direction of the linear motion by the at least one return spring.

Furthermore, the knock out assembly may further include a crossbar, wherein the linear motor is coupled to the crossbar, the at least one return spring is coupled to the crossbar, and the knock out shaft is coupled to the cross bar.

In one or more embodiments, the knock out assembly may also include a base to which the linear motor is mounted.

Embodiments of the knock out assembly may also provide for wherein the base comprises a primary mounting bracket, the primary mounting bracket comprising a protrusion having a through hole configured to accommodate the knock out shaft.

According to one or more embodiments, the knock out assembly may further include a spring mounting bracket, wherein the at least one return spring is mounted to the spring mounting bracket, and wherein the spring mounting bracket is mounted on the protrusion of the primary mounting bracket.

Also, the knock out assembly may further include wherein the protrusion of the base further comprises a flat portion for mounting the at least one return spring.

In some embodiments, the linear motor of the knock out assembly may be a linear servo motor.

In an embodiment, the knock out assembly may also include a crossbar, wherein a first return spring and a second return spring are mounted to the crossbar at opposing ends of the crossbar, wherein the linear motor is centrally mounted to the crossbar, and wherein the knock out shaft is mounted to the crossbar between the linear motor and the first return spring, and a second knock out shaft is mounted to the crossbar between the linear motor and the second return spring.

According to one or more embodiments, the knock out assembly may include a base comprising a primary mounting bracket, the primary mounting bracket comprising a first protrusion and a second protrusion, the first protrusion and the second protrusion each having a through hole configured to accommodate the knock out shaft and the second knock out shaft respectively.

In some embodiments, the knock out assembly may include wherein each through hole of the first protrusion and the second protrusion is configured to accommodate a linear ball bearing.

According to one or more embodiments, the knock out assembly may include a crossbar, a base, and a primary mounting bracket, which is mounted to the base, wherein the at least one return spring is mounted to the base, and wherein the linear motor is mounted to the linear motor mounting bracket.

According to one or more embodiments, the knock out assembly may include a base, the base comprising a primary mounting bracket and a linear motor mounting bracket, wherein the linear motor mounting bracket is configured to allow detachable mounting of the linear motor to the primary mounting bracket.

According to one or more embodiments, there is disclosed a method for knocking out product, the method comprising moving a knock out shaft in a linear motion by a linear motor and knocking out product by a knock out cup due to the linear motion of the knock out shaft, wherein the moving of the knock out shaft compresses a return spring, the return spring being configured to move the knock out shaft in a direction of the linear motion.

In some embodiments, there may be provided a paper feed unit for placing material underneath the ingredients for the knocking out. The paper feed unit may comprise of a mechanism to lift the paper from a paper tray and a vacuum system to suction paper for moving from the paper tray to positioning underneath the ingredients for the knocking out. In some embodiments, the paper feed mechanism is driven by at least one servo motor driving a belt. Embodiments of the vacuum system may utilize venture vacuum pumps in order to provide vacuum.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Although the description discloses application to patty or meat formation, it is not restricted to such. Application to other production methods, such as baked goods, requiring knock out may be understood by one of ordinary skill in the art.

According to embodiments of the food processing machine using servo motors, the food processing machine of the present disclosure may significantly reduce the number of components as compared to using hydraulic systems or complex gear drives. The use of servo motors may allow for discrete components that are controlled by means of programming. This allows for changes in timing or operation rate through software without the requirement of changing linkages or connections. Also, by using servo motor driven components, the food processing machine may operate quietly and be simple to service.

Figure 1:
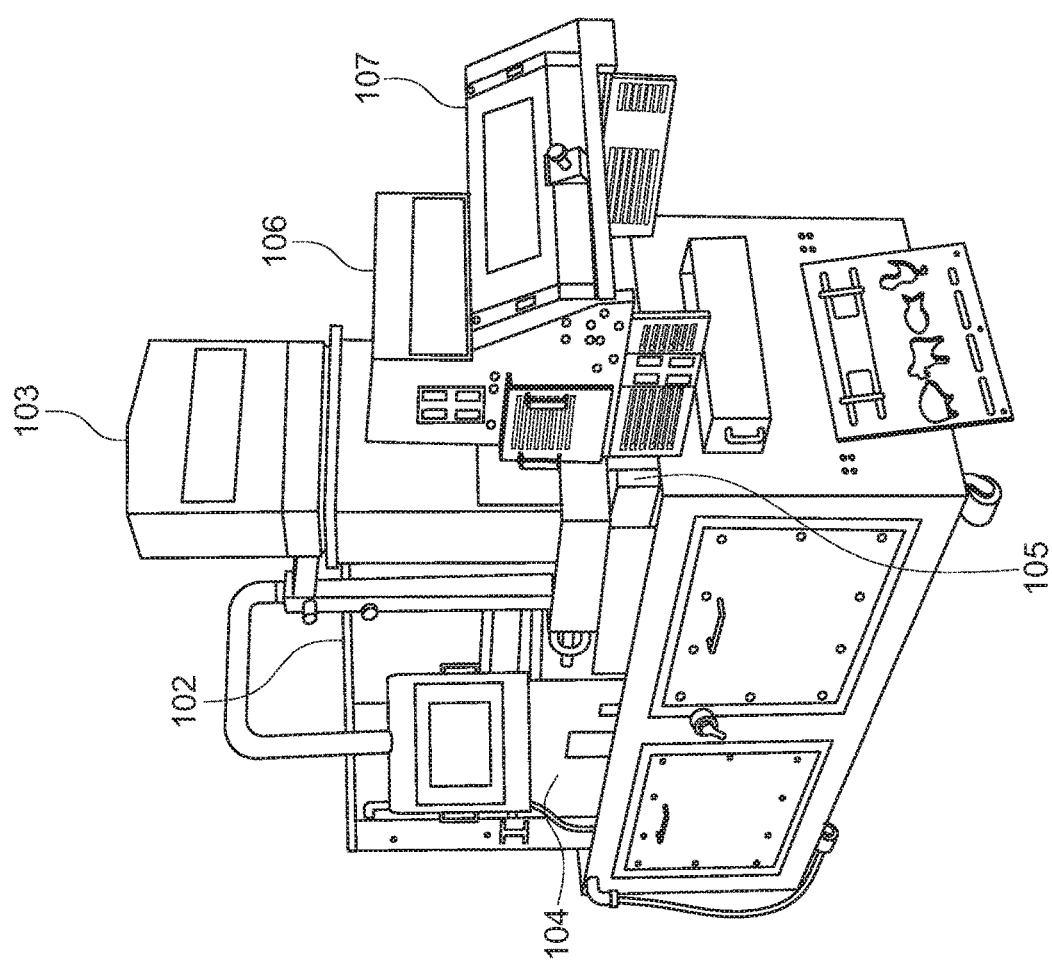
FIG. 1 shows an exemplary embodiment of a food processing machine apparatus.

FIG. 1 shows an exemplary food processing machine 101 including a conveyer belt drive 102, a feed screw system 103, a linear feed system 104, a tube valve 105, a mold plate, a stripper device, a knock out assembly 106, and a paper feed unit 107.

Figure 2:
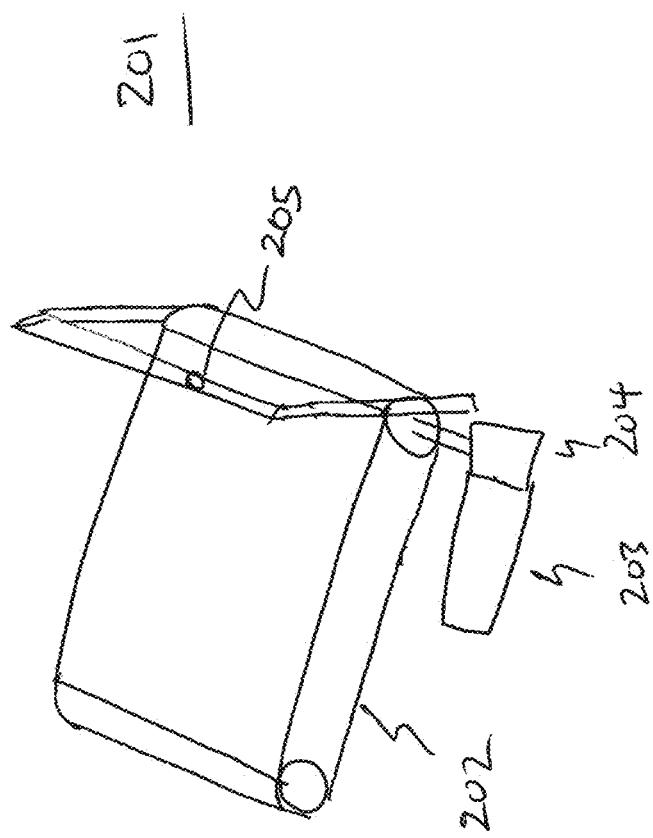
FIG. 2 shows an exemplary embodiment of a conveyer belt drive of the apparatus using a servo motor.

FIG. 2 shows an embodiment of a servo motor controlled conveyer belt drive system 201 for an initial feeding of the ingredients for processing in the present disclosure. The conveyer belt drive may comprise of a conveyer belt 202 driven by at least one servo motor 203. In some embodiments, the conveyer belt 202 may be in a walled section for the depositing of ingredients to begin operation of the food processing device. The at least one servo motor 203 may be coupled to the conveyer belt 202 by a 90 degree angle gearbox 204. This may be for packaging or footprint purposes so the at least one servo motor 203 does not overhang from the food processing machine. The use of a servo motor may allow for adjustable rate of feed of the ingredients. The conveyer belt drive system may also incorporate sensors 205, such as an ingredient temperature sensor or an ingredient quantity sensor, to provide feedback for monitoring and controlling the rate of feed.

In some embodiments, the ingredient temperature sensor would issue an alarm to an operator if the ingredients passed a threshold temperature. For example, this may be an unsafe temperature for raw meat. In some embodiments, the ingredient quantity sensor, non-limiting examples including optical or proximity sensors, may be used to adjust the feed rate of the conveyer belt and/or the other components of the food processing machine.

Figure 3:
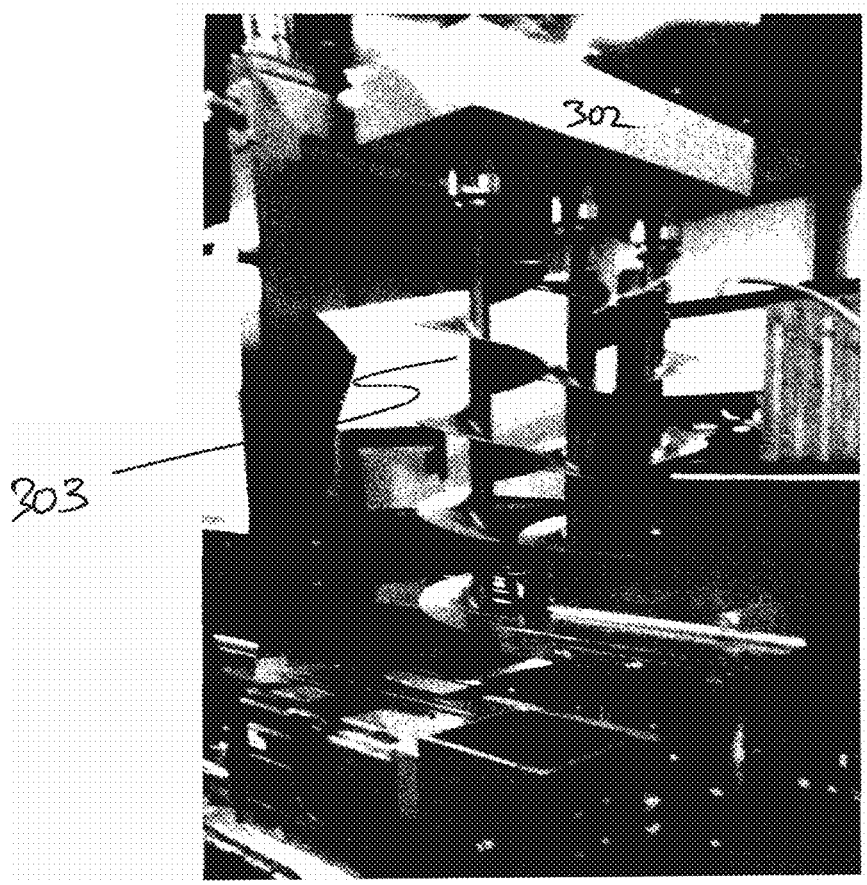
FIG. 3 shows an exemplary embodiment of a feed screw drive of the apparatus using a servo motor.

FIG. 3 shows an embodiment of a feed screw system 301 using servo motors 302 to control the feed screws 303. The servo motors 302 may be housed in a housing In some embodiments, the ingredients may be fed by the conveyer belt to the feed screw system. The feed screw system may comprise of a servo motor driving a feed screw. This feed screw may then move the ingredients to a loading area. By using a servo motor to drive the feed screw, it is possible to adjust the feed rate of ingredients to operate at a set constant rate.

Figure 4:
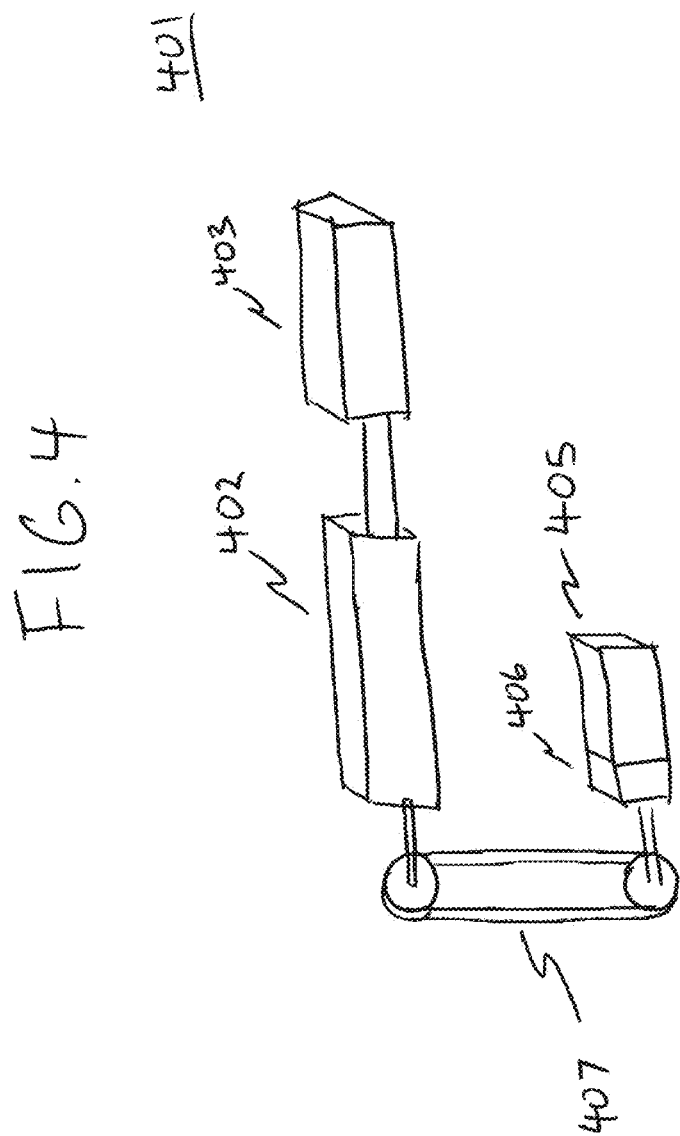
FIG. 4 shows an exemplary embodiment of a linear feed system of the apparatus using a servo motor.

FIG. 4 discloses an embodiment of a linear feed system 401. According to some embodiments, the ingredients may be moved by a linear feed system for loading of mold plates. One or more embodiments may use a ball screw 402 to move a plunger 403 to force the ingredients towards a mold plate 404. The ball screw 402 may be powered by a servo motor 405 through a gearbox 406 and/or belt drive 407. Due to the ball screw 402, the plunger 403 moves in a linear motion in order to push ingredients from a loading area by the feed screws towards a mold plate.

Although a ball screw is used, alternative linear actuators such as stepper motors or jack screws could be used. Also, although a belt drive is used to couple the servo motor 405 with the ball screw 402, alternatives could include chain drive or a direct coupling from the servo motor or gearbox to the ball screw. FIG. 4 shows a configuration where the output shaft of the servo motor and gearbox face in one direction for attachment by belt drive to an input shaft of ball screw 402. Orientation is not limited by such an arrangement, and the components could be arranged in other configurations depending on the footprint of the food processing machine. In some embodiments with a plurality of ball screws and plungers, the ingredients may be moved through a tube valve which can alternate feeding of ingredients between the plurality of plungers.

Figure 5:
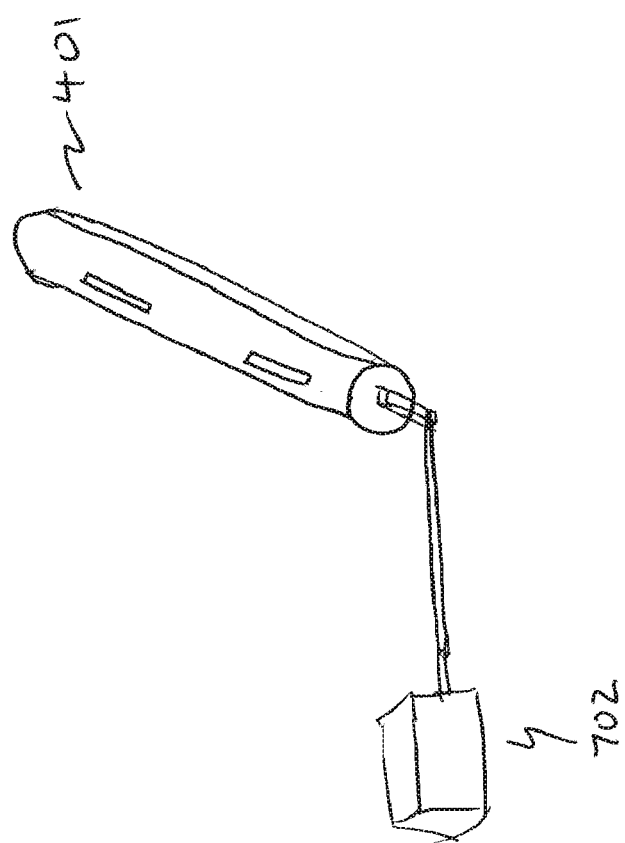
FIG. 5 shows an exemplary embodiment of a tube valve assembly of the apparatus using a linear servo motor.

FIG. 5 shows an embodiment of the tube valve 401. The tube valve has a plurality of openings and is rotatable to allow flow of ingredients from one of the plungers to the mold plate. The tube valve may be configured to operate in at least two positions in order to alternate feeding of ingredients from the plurality of plungers. In some embodiments, a linear servo motor 402 may be used to control the tube valve 401. The tube valve 401 may be coupled to the linear servo motor such that the linear motion of the servo motor results in a rotation of the tube valve 401 from a first position to a second position.

Figure 6:
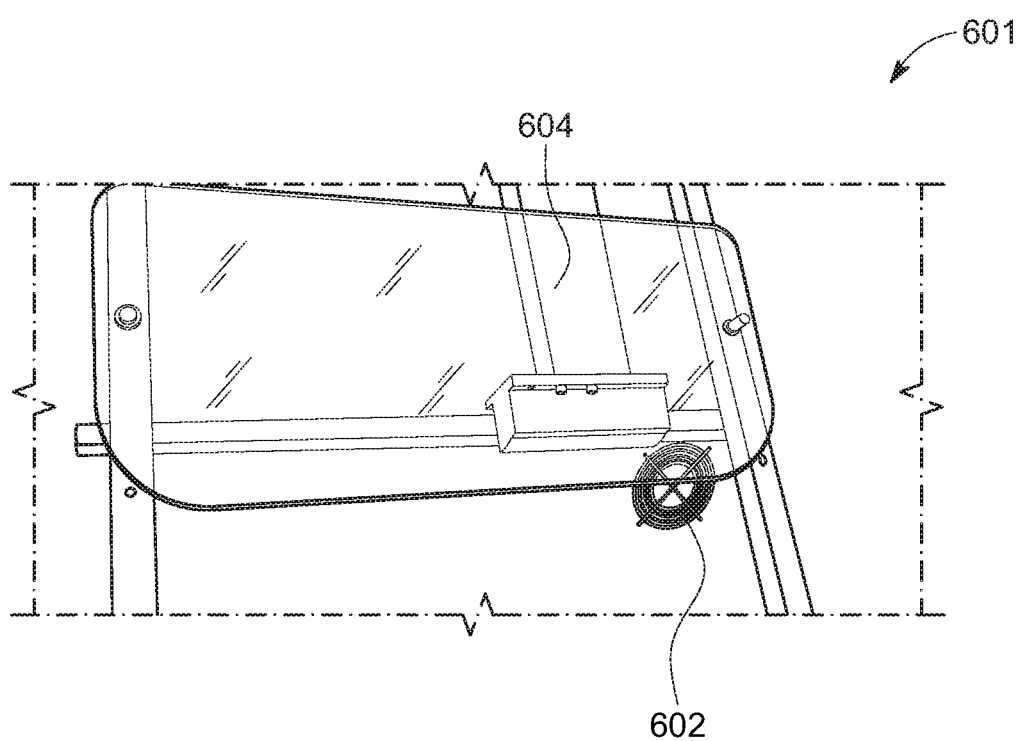
FIG. 6 shows an exemplary embodiment of a mold plate drive of the apparatus using a linear servo motor.

FIG. 6 shows an embodiment of a mold plate drive 601 using a linear servo motor 602. According to some embodiments, a mold plate 603 may be loaded with ingredients when in a first position. The mold plate 603 may then be moved in a linear direction by means of a linear servo motor 602 to a second position for interaction with a knock out assembly. The linear servo motor provides a linear driving force for movement of the mold plate. In some embodiments, the mold plate 603 may be coupled to a holder or bracket 604. The bracket is then in turn coupled to the linear servo motor 602. Thus, movement of the linear servo motor results in the movement of the mold plate in a linear direction. In addition to the linear servo motor, the mold plate may also be coupled to slide along at least one guide rod attached to the frame of the food processing machine. In some embodiments, the bracket 604 may be slideably attached to at least one guide rod.

Figure 7:
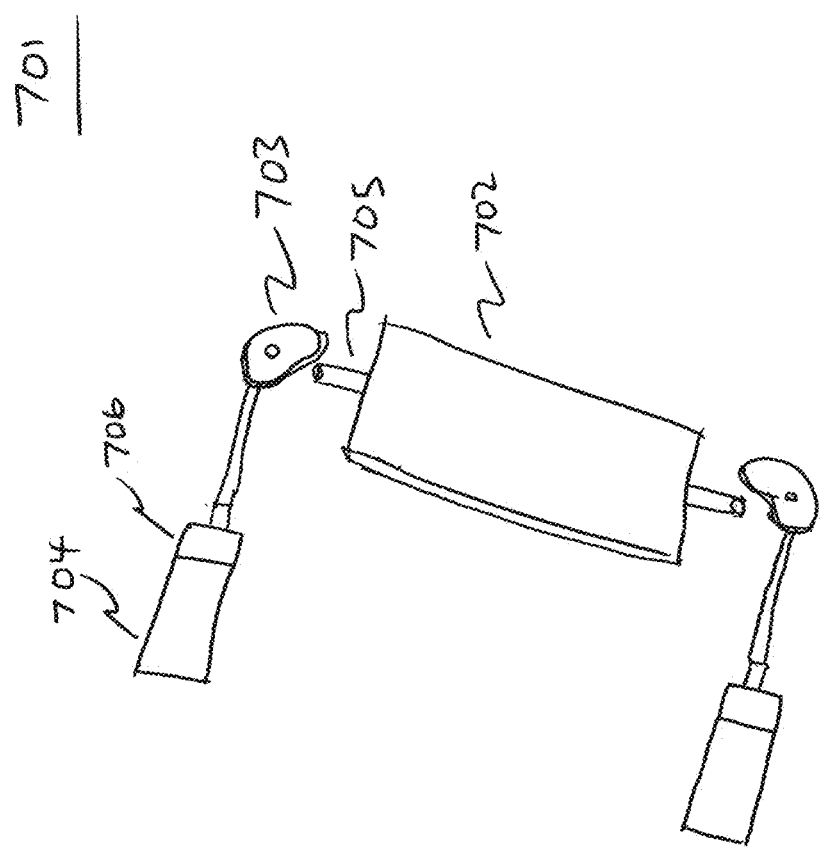
FIG. 7 shows an exemplary embodiment of a stripper device of the apparatus using servo motors.

FIG. 7 shows an embodiment of a stripper or shearing device 701 for interacting with the ingredients upon loading into the mold plate. The stripper device may comprise a stripper plate 702, cams 703, and servo motors 704. The stripper device may be used to shear a surface of the ingredients in order to provide a change in texture.

In some embodiments, the stripper device may be actuated by driving of the cam by the servo motor. In some embodiments, there may be two servo motor driven cams 703 situated near opposed sides of the stripper plate 702. The stripper plate 702 may have attached pins 705 on the opposed sides. These pins 705 may extend from the stripper plate 702 such that they can be activated by the cams 703. Each cam has a profile such that a rotation of the cam pushes the stripper plate 702 in one direction. Accordingly, the opposed cams can each push the stripper plate in opposed directions, respectively, such that the stripper plate can reciprocate across the mold plate. To drive the cams 703, each servo motor 704 may be attached to a gearbox 706 and then coupled to each cam 703 respectively.

Alternatively, the cam may act on an edge surface of the stripper plate. Still, in other embodiments, a cam or crank may be attached to the stripper plate such that a rotation of the cam or crank both pushes and pulls the stripper plate.

Figure 8:
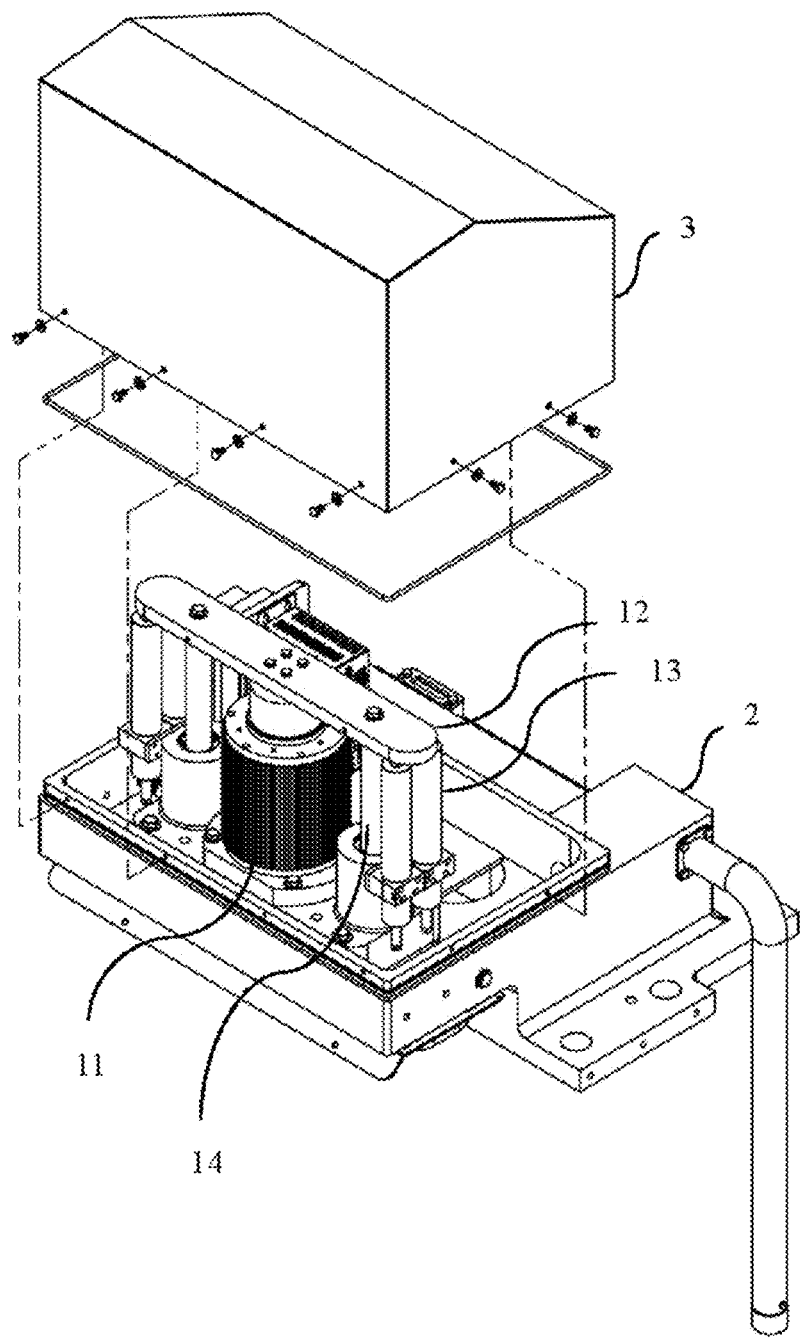
FIG. 8 shows an exemplary embodiment of a knock out assembly of the apparatus using a linear servo motor.

FIG. 8 shows an exemplary embodiment of the present disclosure. The knock out assembly 1 generally has at least a base 2, a linear servo motor 11, a crossbar 12, return springs 13, and knock out shafts 14 coupled to knock out cups (not shown). The entire assembly may also be covered by an assembly cover 3.

The linear servo motor 11 and return springs 13 are attached to the base 2 of the assembly, and one end of each is also attached to the crossbar 12. A first end of a knock out shaft 14 is attached to the crossbar 12 and the second end is coupled to a knock out cup, which is shaped as necessary for the desired food product. The knock out shaft 14 extends through the base 2 in order to couple with the knock out cup below the base.

Figure 9:
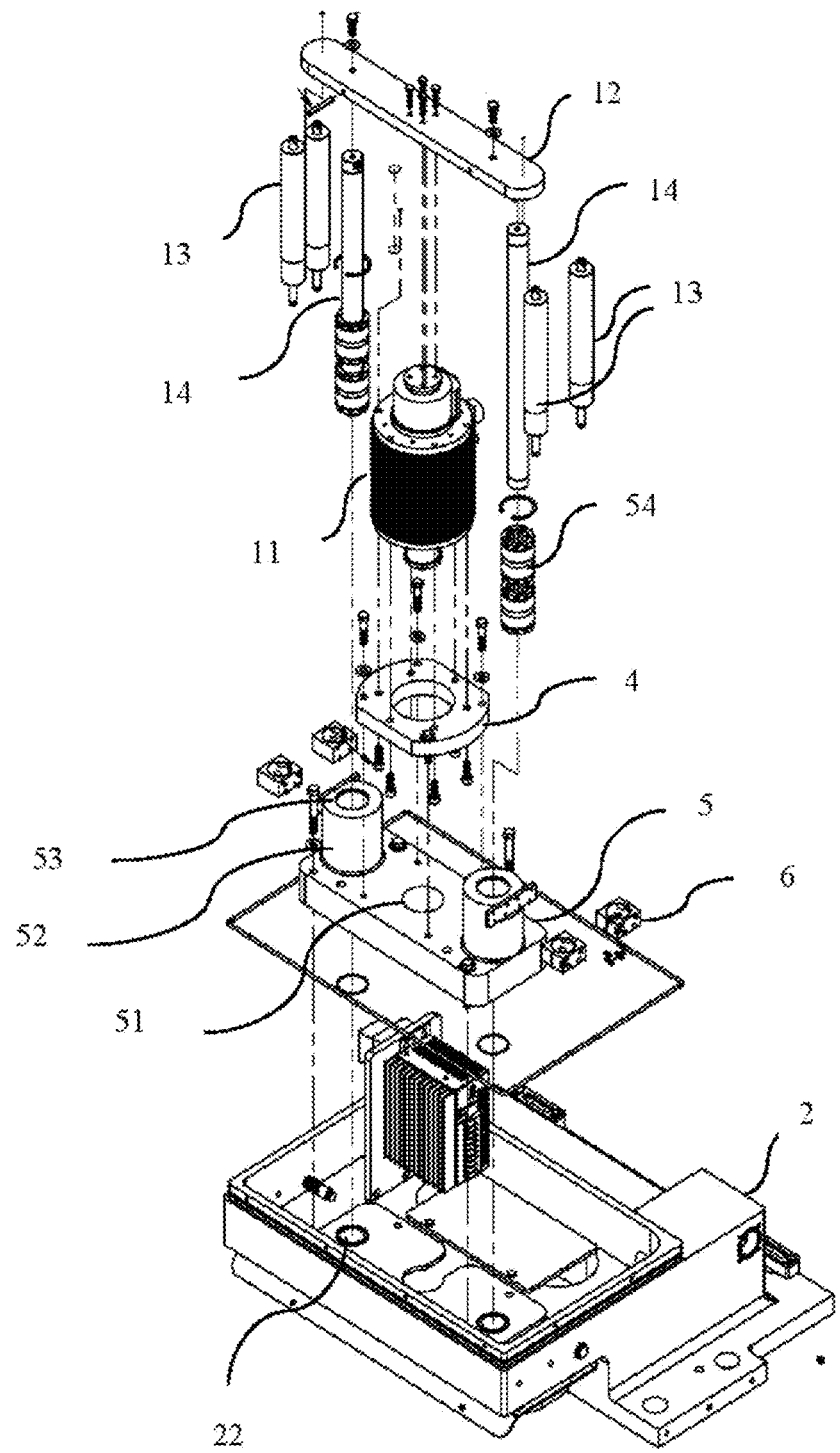
FIG. 9 shows the exemplary embodiment of a knock out assembly of the apparatus using a linear servo motor in an exploded view.

With reference to FIGS. 8 and 9, an end of a knock out shaft 14, in a downward direction, may be configured to have attached a knock out cup configured to knock out the shaped food from the mold plate, and the end of the knock out shaft 14, in the downward direction, may be configured to move the knock out cup, from being completely above the mold plate in the upward direction, towards the mold plate when the knock out shaft 14 moves in the downward direction to knock out the shaped food. In embodiments, the knock out shaft 14 and the linear servo motor 11 may be attached to the crossbar 12 at respective locations of the crossbar 12 that are separate from each other in a horizontal direction, such that the knock out shaft 14 and the linear servo motor 11 are separated by a space from each other in the horizontal direction. In embodiments, the linear servo motor 11, the return springs 13, and the knock out shafts 14 may be attached to a same side of the crossbar 12 that is towards a downward direction.

In an exemplary embodiment, the return springs 13 may be magnetic springs. Additionally, the number of return springs may be one or more. The knock out assembly is not limited to four return springs as shown in the exemplary embodiment. The number of return springs may be different for various considerations. For example, in alternative embodiments, the knock out assembly may have two return springs on each end of the crossbar 12 for a total of 4 return springs. In non-limiting embodiments, these return springs may be aligned along the longitudinal axis of the crossbar 12 or grouped at the ends of the crossbar 12. In some embodiments, the return springs may be spaced along the crossbar 12.

Although the embodiment of FIG. 8 shows two knock out shafts 14, alternative embodiments may include differing numbers of knock out shafts 14.

Also, although embodiments with magnetic return springs are disclosed, alternative springs could be used, not limited to conventional, magnetic, electric, pneumatic, or hybrids.

In some embodiments, the knock out shaft 14 may be directly attached to a singular knock out cup or other tooling. Alternatively, the knock out shaft 14 may attach to an intermediate crossbar or other attachment means to which a plurality of knock out cups are attached. In some embodiments, at least two knock out shafts are coupled together to couple with the knock out cups. Additionally, the knock out cups could be of a variety of shapes in order to form the desired foods.

Also, while the description discloses use of a linear servo motor, alternative linear movement power units could be used. These may include, but are not limited to, solenoid units. The primary concern is a power unit that can operate linearly without the need for complex hydraulics or angled gearboxes.

FIG. 9 shows an exploded view of an exemplary embodiment of the present disclosure. In the embodiment, a primary mounting bracket 5 is attached by fasteners to the base 2. The primary mounting bracket 5 has a linear servo motor mounting portion 51 and two knock out shaft protrusions 52. The knock out shaft protrusions 52 may be cylindrical and protrude upward from the base. Alternatively, the top view cross sectional shape of the knock out shaft protrusions 52 may be another shape, such as a square or triangle. The cross sectional shape may be a basis for mounting considerations of related accessories, such as the return springs 13. The knock out protrusions 52 may have a flat portion 55 for attachment of a return spring bracket 6. Alternatively, the knock out protrusions 52 may be a square or triangle such that there is a flat surface for attachment of a return spring bracket 6. Even in the case of a flat surface, there may still be a ledge or stepped flat portion for mounting of a return spring bracket to enable easier positioning and mounting.

The knock out shaft protrusions 52 each have a through hole 53 for accepting and guiding the knock out shaft 14. Within the through hole 53, there can be at least one linear bearing, ball bushing, or shaft guiding 54 to provide for smooth movement of the knock out shaft 14. The linear bearing may be a linear ball bearing, bearing pad, or other component. The through hole 53 of each knock out protrusion 52 also matches up with through holes 22 in the base 2. This allows for the knock out shaft 14 to extend out of the base 2 in order to couple with the knock out cups.

Upon the primary mounting bracket 5, a linear motor mounting bracket 4 may be attached by fasteners. The linear motor mounting bracket 4 is attached to the linear servo motor mounting portion 51 of the primary mounting bracket 5. The linear motor mounting bracket 4 may be shaped in order to allow for the proper spacing and mounting of a variety of linear servo motors. The use of a linear motor mounting bracket may allow for removal of the linear servo motor without the need to disassemble the other components of the knock out assembly.

The linear servo motor 11 can thus be fixedly mounted to the linear motor mounting bracket 4 on top of the primary mounting bracket 5. A driving end of the linear motor mounting bracket is then coupled to the crossbar 12 by fasteners. Accordingly, application of the linear motor can result in vertical movement of the crossbar 12 relative to the base 2.

The crossbar 12 is also attached at an outboard location to return springs 13. The return spring 13 is attached on one side to the crossbar 12 and on another side to return spring bracket 6. These return spring bracket 6 is attached to the flat portion 55 of the knock out shaft protrusion 52 of the primary mounting bracket 5 such that the return spring 13 pushes between the crossbar 12 and the primary mounting bracket 5. While the return spring 13 may be attached to the crossbar 12 and the return spring bracket 6 at opposing ends of the return spring 13, the return spring 13 can also be attached to one of the crossbar 12 and the return spring bracket 6 by a moving shaft of the return spring and a location along an outer body casing of the return spring 13 respectively.

Alternatively, one or more embodiments may have the return spring 13 configured to be attached to the crossbar 12 and to the cover 3 or another fixed element above the crossbar 12. In such an embodiment, the return spring 13 would be extended when the linear servo motor is in the down position.

Also, the crossbar 12 is coupled to one end of the knock out shaft 14, and the knock out shaft 14 is coupled to the knock out cups at a second end. Accordingly, when the linear servo motor 11 operates to move the crossbar 12, the knock out shaft 14 is also moved and the return spring 13 is compressed. This results in the knock out shaft 14 moving downward and also forcing the attached knock out cups towards a mold plate mounted to the food processing machine. Upon this movement, the compressed return spring 13 also exerts a restoring force to return the crossbar to an upward position, thereby lifting the knock out cups from the mold plate.

The return spring provides a restoring force to return the knock out cups away from the mold plate. This is useful as a loss of power to the linear servo motor without a return mechanism may result in the servo motor dropping downward. As the mold plate in a food processing machine moves in and out of position for knock out, the dropping of the servo motor in a loss of power situation may result in the knock out cups hitting the mold plate and damaging both components. The inclusion of the return spring prevents an uncontrolled drop of the linear servo motor that would result in damage to the knock out cups and mold plate.

Accordingly, this embodiment provides for the movement of the knock out cups towards the mold plate without the complexities of hydraulic controls or 90 degree gearboxes to translate horizontal rotational motor movement into vertical movement by way of cams.

While the embodiment of FIG. 9 has the return spring bracket 6 mounted to a flat portion 55 of the primary mounting bracket 5, the return spring bracket could alternatively be mounted to the base 2.

In alternative embodiments, a plurality of linear servo motors may be positioned on outer portions of the crossbar and the springs positioned on a central or inner portion of the crossbar. A plurality of linear servo motors that are synchronized may be used instead of one linear servo motor.

Also, while the shape of the crossbar 12 is generally beam-like in FIG. 8, alternative shapes may be used. For example, a square shaped crossbar or plate could be utilized where the linear servo motor is attached the middle and the return springs are attached at corners of the square shaped crossbar. Alternative shapes such as a circle or a triangle could also be used for the crossbar. Alternative shapes of the crossbar 12 may also be combined with differing embodiments with different numbers of linear motors, knock out shafts, and return springs.

In alternative embodiments, the configuration of the springs and linear servo motor may be changed. For example, the spring or plurality of springs may be fixed from above the crossbar to another structure of the food forming machinery such that the spring would exert a pulling force to lift the crossbar rather than a pushing force on the crossbar. Also, the linear servo motor may be fixed from above the crossbar to another structure of the food forming machinery such that the motor would exert a pushing force to push the crossbar and coupled knock out cups downward into the mold plate. Such a structure of the food forming machinery may include the assembly cover 3. Accordingly, one of ordinary skill would understand various configurations where the springs and linear servo motors may either push or pull on the crossbar.

Also, although the exemplary embodiment uses a variety of brackets in the primary bracket 5, linear motor mounting bracket 4, and return spring bracket 6, these brackets may be integrally formed with the base 2. In this way, these brackets may be bracket portions of the base 2 rather than separate components.

Figure 10:
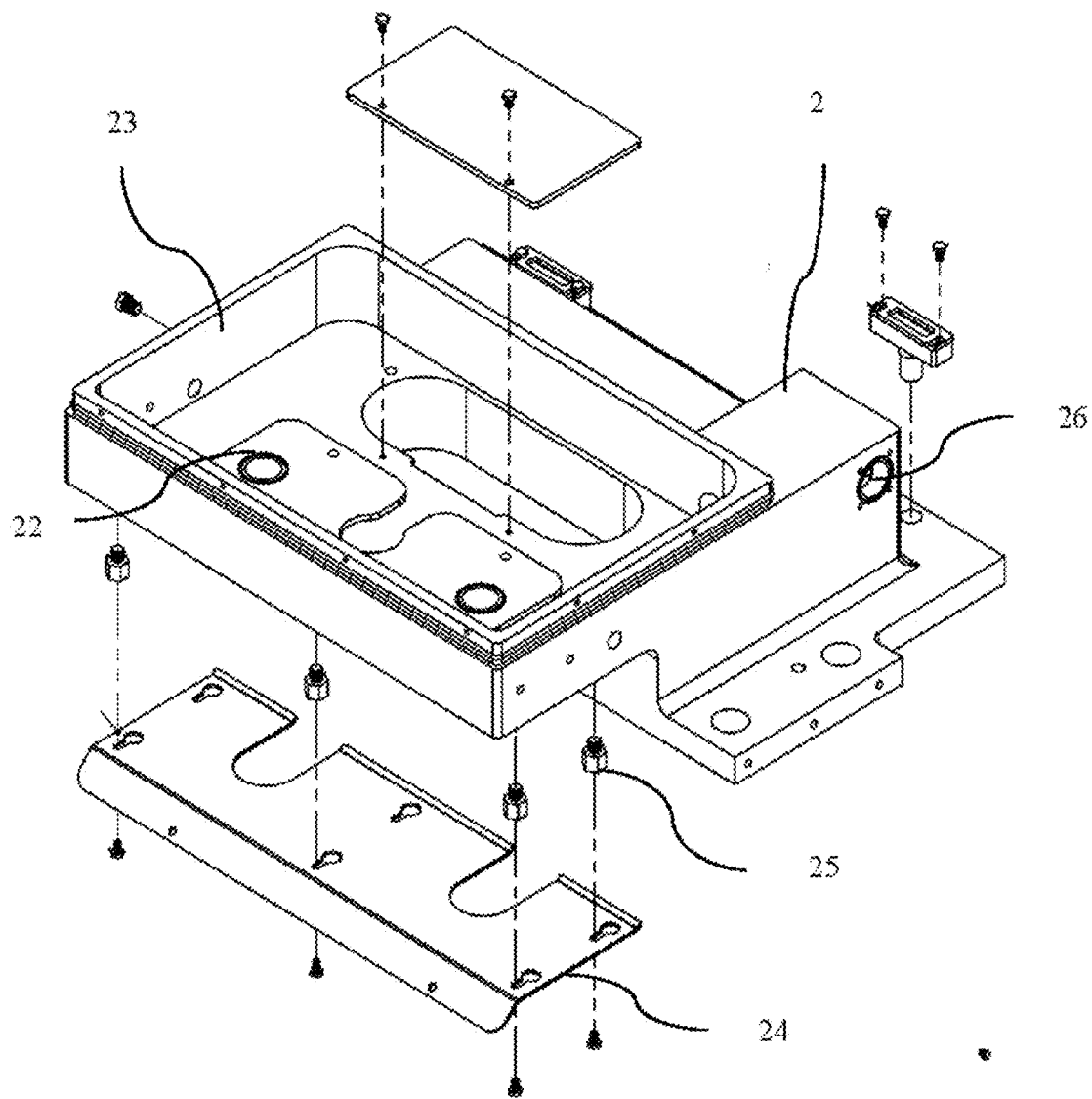
FIG. 10 shows an orthogonal view of a base of an embodiment of a knock out assembly of the apparatus using a linear servo motor.

FIG. 10 shows the elements related to the base 2. The base 2 includes a central recess 23 for the mounting of the primary bracket 5 and the related components for the linear servo motor 11. The base also includes a heat shield 24 below the base 2 that is attached at a distance away from the base by heat shield standoffs 25 and fasteners. Furthermore, the base 2 includes through holes from the recessed portion to the bottom of the base 2 to accommodate knock off shafts 14. Also, embodiments of the base 2 may include an external wiring port 26 connected to an opening in the central recess 23 for running of wiring and other connections from the central recess 23 out of the knock out assembly.

Figure 11:
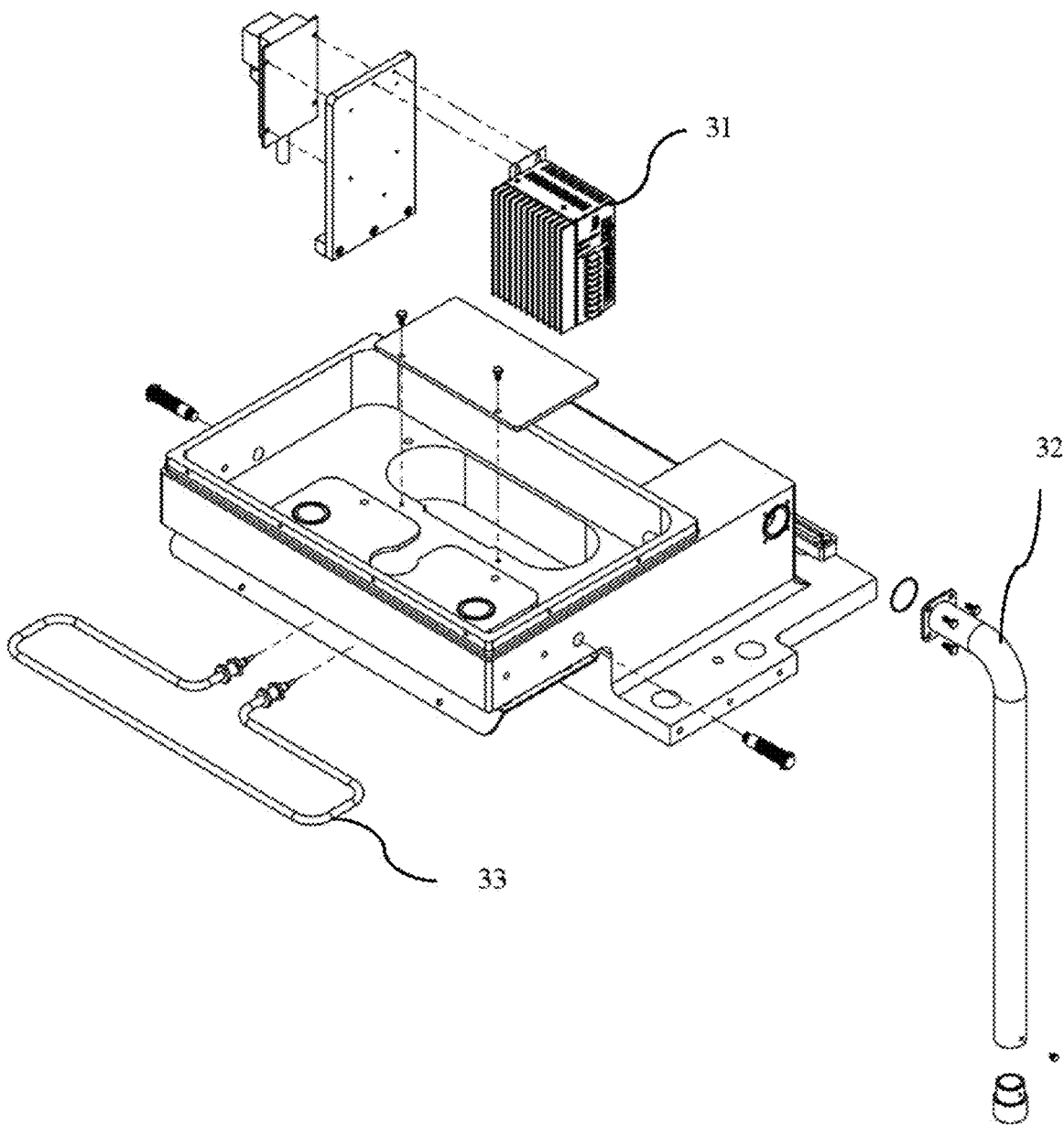
FIG. 11 shows an orthogonal view of the base of the embodiment of a knock out assembly of the apparatus using a linear servo motor.

FIG. 11 further shows the elements related to the base 2. FIG. 11 further shows the inclusion of a radiant heating loop 33. The radiant heating loop 33 may be a resistance heater or other heating element. The radiant heating loop 33 may be mounted to the base under the heat shield 24. The radiant heating loop 33 may provide heat in order to maintain a temperature difference between the food product and the knock out cups in order to prevent sticking. In alternative embodiments, the radiant heating loop 33 may be positioned underneath the base 2 by attachment to the food forming machinery other than by direct attachment to the knock out assembly. In an alternative embodiment, the radiant heating loop may be positioned off a mount attaching to the base structure of the food forming machinery.

In some embodiments, a knock out assembly heater 31 can also be attached to the base 2 in order to achieve the temperature difference. This may occur where a food processing machine is not pre-wired for a radiant heating loop in the knock out assembly.

Furthermore, FIG. 11 shows the base 2 may have a conduit or pipe 32 attached to the external wiring port 26 in order to provide a route for electrical wiring from the various components of the knock out assembly to be routed to the food processing machine.

Figure 12:
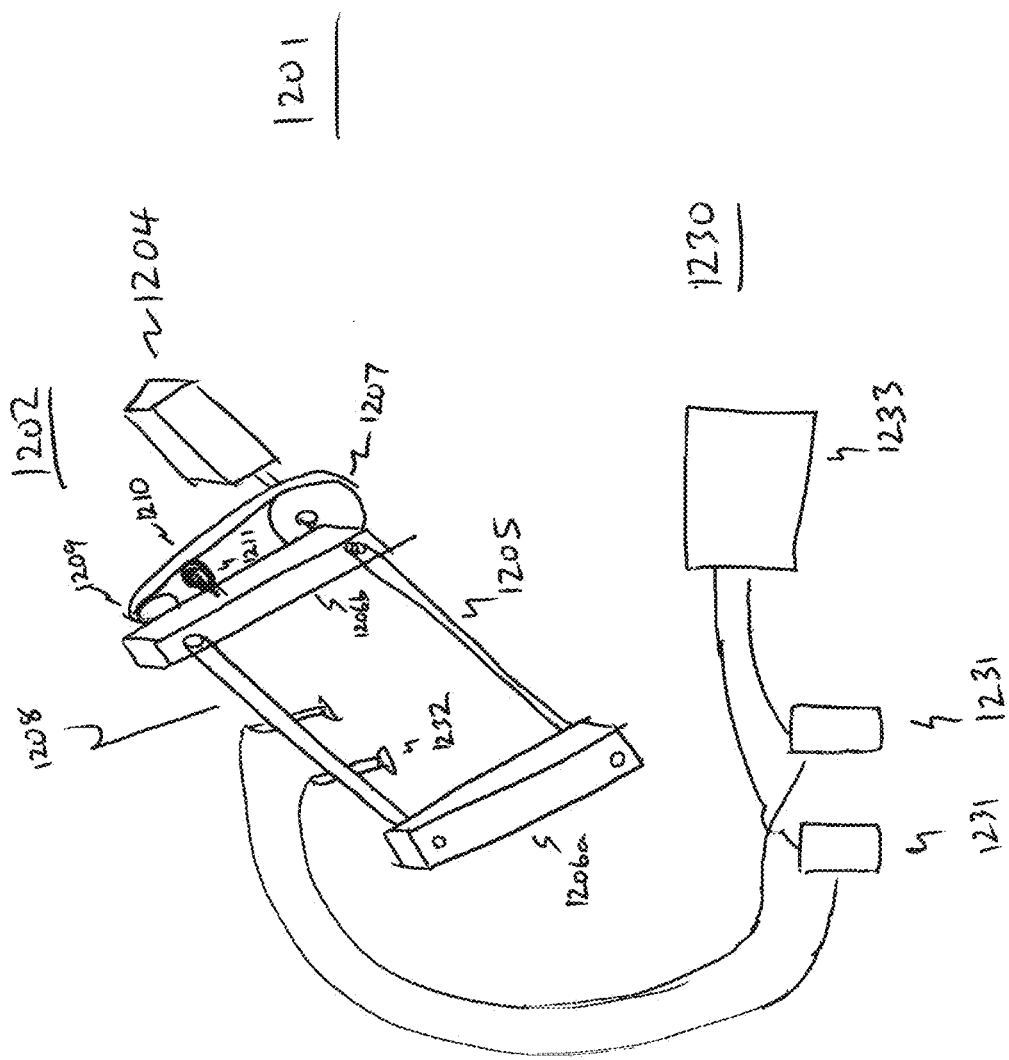
FIG. 12 shows an exemplary embodiment of a paper feed unit of the apparatus using a linear servo motor.

FIG. 12 shows an embodiment of a paper feed unit 1201 for placing material underneath the ingredients for the knocking out by the knock out assembly. The paper feed unit may comprise of a mechanism 1202 to lift the paper from a paper tray 1203 and a vacuum system 1230 to suction paper for moving from the paper tray to positioning underneath the ingredients for the knocking out. In some embodiments, the paper feed mechanism 1202 is driven by at least one servo motor 1204 driving a belt and/or shaft. Embodiments of the vacuum system 1230 may utilize Venturi vacuum pumps 1231 in order to provide vacuum.

In some embodiments of the paper feed mechanism 1202, there is a servo motor 1204 connected to a first rotation shaft 1205. A first gear 1207 sits on the first rotation shaft, but is fixed and does not rotate with the first rotation shaft. This shaft has first ends of a first arm 1206a and a second arm 1206b attached to it. A second rotation shaft 1208 is coupled to the second ends of the first and second arms 1206a, 1206b. The second rotation shaft is coupled to a second gear 1209, which is coupled to the first gear 1207 by a belt 1210. In some embodiments, there may be a further idler gear 1211 partway between the first gear 1207 and the second gear 1209. Due to the fixed position of the first gear 1207, when the first rotation shaft rotates, the belt 1210 causes the second gear 1209 to rotate. This causes a rotation of the second rotation shaft.

In this way, vacuum suctions 1232 attached to the second rotation shaft can rotate towards the paper tray when the paper feed mechanism 1202 is in one position and then rotate away in order to position the paper when in a second.

Embodiments of the vacuum system 1230 may utilize Venturi vacuum pumps 1231 in order to provide vacuum. In some embodiments, the vacuum system 1230 comprises a pressurized air source 1233 connected to a plurality of Venturi vacuum pumps 1231. In some embodiments, this may be achieved through splitters.

Each Venturi vacuum pump operates by generating vacuum as a result of the pressurized air. Accordingly, a very compact vacuum system 1230 can be realized for the paper feed mechanism. The vacuum generated by the Venturi vacuum pumps can be distributed to the vacuum suctions 1232 attached to the second rotation shaft. Accordingly, the vacuum system may engage vacuum when the vacuum suctions 1232 are in the first position on the paper from the paper tray. After moving to the second position for positioning of the paper for knock out, the vacuum can be switched off and the paper is thereby released.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

The knock out assembly base may be an integrated part of a food processing machine or separate. Embodiments of the disclosure may be replacement or bolt-on knock out assemblies for retrofitting on machines, such as the aforementioned hydraulic or cam driven machines.

The various components of the knock out assembly may be made from a variety of materials, not limited to metals, composites, or plastics. It is noted that various combinations of components of similar or differing materials may be used.

The invention claimed is:
1. A food processing machine, the food processing machine comprising:
   a knock out assembly comprising:
      a first linear motor;
      a return spring; and
      a knock out shaft that is configured to be moved in a first direction of a linear motion by the first linear motor to knock out shaped food from being held by a mold plate and configured to be moved in a second direction of the linear motion by the return spring, wherein the first direction is opposite to the second direction, an end of the knock out shaft, in the first direction, is configured to have attached a body configured to knock out the shaped food from the mold plate, and the end of the knock out shaft, in the first direction, is configured to move the body from being completely above the mold plate in the second direction towards the mold plate when the knock out shaft moves in the first direction to knock out the shaped food.

2. The food processing machine according to claim 1, further comprising:
a conveyer belt drive comprising:
a first servo motor;
a conveyer belt to move food from an initial feeding area towards the knock out assembly; and
a sensor configured to detect a characteristic of the food,
wherein the conveyer belt is controlled by the first servo motor at variable rates based on the characteristic of the food.

3. The food processing machine according to claim 2, further comprising:
a feed screw drive comprising:
a second servo motor; and
a feedscrew configured to move the food from the conveyer belt toward a loading area,
wherein a feedscrew rate of rotation can be adjusted by the second servo motor to a constant rate.

4. The food processing machine according to claim 2, further comprising:
a tube valve control for food processing, comprising:
a tube valve;
a second linear motor; and
a linkage,
wherein the second linear motor causes the tube valve to rotate from a first position to a second position to control a flow of the food from a loading area to the mold plate.

5. The food processing machine according to claim 4, further comprising:
a stripper device for food processing, comprising:
a third servo motor;
a cam; and
a stripper plate,
wherein the third servo motor and the cam move the stripper plate to texturize the food positioned with the mold plate.

6. The food processing machine according to claim 4, further comprising:
a paper feed vacuum, comprising:
vacuum suction hoses configured to move paper to receive the knocked out shaped food;
a venturi vacuum pump.

7. A food processing machine, the food processing machine comprising:
a mold plate drive comprising:
a first linear motor;
a mold plate to position food; and
a mold plate drive bracket,
wherein the mold plate is connected to the mold plate drive bracket and the first linear motor operates in a linear motion to move the mold plate in a parallel linear motion; and
a knock out assembly comprising:
a second linear motor;
a return spring; and
a knock out shaft that is configured to be moved in a first direction of a linear motion by the second linear motor to knock out shaped food from being held by the mold plate and configured to be moved in a second direction of the linear motion by the return spring,
wherein the first direction is opposite to the second direction,
an end of the knockout shaft, in the first direction, is configured to have attached a body configured to knock out the shaped food from the mold plate, and
the end of the knock out shaft, in the first direction, is configured to move the body from being completely above the mold plate in the second direction towards the mold plate when the knock out shaft moves in the first direction to knock out the shaped food.

8. The food processing machine according to claim 7, further comprising:
a conveyer belt drive comprising:
a first servo motor;
a conveyer belt to move food from an initial feeding area towards the mold plate drive; and
a sensor configured to detect a characteristic of the food,
wherein the conveyer belt is controlled by the first servo motor at variable rates based on the characteristic of the food.

9. The food processing machine according to claim 8, further comprising:
a feed screw drive comprising:
a second servo motor; and
a feedscrew configured to move the food from the conveyer belt toward a loading area,
wherein a feedscrew rate of rotation can be adjusted by the second servo motor to a constant rate.

10. The food processing machine according to claim 9, further comprising:
a tube valve control for food processing, comprising:
a tube valve;
a third linear motor; and
a linkage,
wherein the third linear motor causes the tube valve to rotate from a first position to a second position to control a flow of the food from the loading area to the mold plate.

11. The food processing machine according to claim 10, further comprising:
a stripper device for food processing, comprising:
a third servo motor;
a cam; and
a stripper plate,
wherein the third servo motor and the cam move the stripper plate to texturize the food positioned with the mold plate.

12. A food processing machine, the food processing machine comprising:
a linear feed system comprising:
a first servo motor;
a ball screw; and
a plunger to move food towards a mold plate,
wherein the first servo motor rotates such that the ball screw has a linear motion to act on the plunger; and
a knock out assembly comprising:
a first linear motor;
a return spring; and a knock out shaft that is configured to be moved in a first direction of a linear motion by the first linear motor to knock out shaped food from being held by the mold plate and configured to be moved in a second direction of the linear motion by the return spring, wherein the first direction is opposite to the second direction, an end of the knockout shaft, in the first direction, is configured to have attached a body configured to knock out the shaped food from the mold plate, and the end of the knock out shaft, in the first direction, is configured to move the body from being completely above the mold plate in the second direction towards the mold plate when the knock out shaft moves in the first direction to knock out the shaped food.

13. The food processing machine according to claim 12, further comprising:
   a mold plate drive comprising:
      a second linear motor;
      the mold plate to position food; and
      a mold plate drive bracket,
         wherein the mold plate is connected to the mold plate drive bracket and the second linear motor operates in a linear motion to move the mold plate in a parallel linear motion.

14. The food processing machine according to claim 1, further comprising
   a crossbar that is attached to the knock out shaft and the first linear motor, wherein
   the knock out shaft and the first linear motor are attached to the crossbar at respective locations of the crossbar that are separate from each other in a direction perpendicular to the first direction and the second direction, such that the knock out shaft and the first linear motor are separated by a space from each other in the direction perpendicular to the first direction and the second direction.

15. The food processing machine according to claim 7, further comprising
   a crossbar that is attached to the knock out shaft and the second linear motor, wherein
   the knock out shaft and the second linear motor are attached to the crossbar at respective locations of the crossbar that are separate from each other in a direction perpendicular to the first direction and the second direction, such that the knock out shaft and the second linear motor are separated by a space from each other in the direction perpendicular to the first direction and the second direction.

16. The food processing machine according to claim 12, further comprising
   a crossbar that is attached to the knock out shaft and the first linear motor, wherein
   the knock out shaft and the first linear motor are attached to the crossbar at respective locations of the crossbar that are separate from each other in a direction perpendicular to the first direction and the second direction, such that the knock out shaft and the first linear motor are separated by a space from each other in the direction perpendicular to the first direction and the second direction.

17. The food processing machine according to claim 7, wherein
   the first linear motor is configured to move the mold plate in a third direction towards the knock out shaft, the third direction being different from the first direction and the second direction.

18. The food processing machine according to claim 13, wherein
   the second linear motor is configured to move the mold plate in a third direction towards the knock out shaft, the third direction being different from the first direction and the second direction.

19. The food processing machine according to claim 14, wherein
   the first linear motor, the return spring, and the knock out shaft are attached to a same side of the crossbar that is towards the first direction.

* * * * *